(12) United States Patent
Anvaripour et al.

(10) Patent No.: US 11,893,790 B2
(45) Date of Patent: *Feb. 6, 2024

(54) AUGMENTED REALITY ITEM COLLECTIONS

(71) Applicant: Snap Inc., Santa Monica, CA (US)

(72) Inventors: Kaveh Anvaripour, Santa Monica, CA (US); Travis Chen, Los Angeles, CA (US); Gabriel Lupin, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/720,892

(22) Filed: Apr. 14, 2022

(65) Prior Publication Data
US 2022/0237914 A1 Jul. 28, 2022

Related U.S. Application Data

(63) Continuation of application No. 16/834,343, filed on Mar. 30, 2020, now Pat. No. 11,335,088.

(51) Int. Cl.
*G06T 19/00* (2011.01)
*G06T 7/73* (2017.01)
(Continued)

(52) U.S. Cl.
CPC .............. *G06V 20/20* (2022.01); *G06F 3/011* (2013.01); *G06F 3/04817* (2013.01);
(Continued)

(58) Field of Classification Search
None
See application file for complete search history.

(56) References Cited

U.S. PATENT DOCUMENTS 8,195,663 B1 6/2012 Hall et al.
8,982,110 B2 3/2015 Saban et al.
(Continued)

FOREIGN PATENT DOCUMENTS

CN 106817394 A 6/2017
CN 115605897 A 1/2023
(Continued)

OTHER PUBLICATIONS

"U.S. Appl. No. 16/834,343, Corrected Notice of Allowability dated Mar. 11, 2022", 2 pgs.
(Continued)

*Primary Examiner* — Tize Ma
(74) *Attorney, Agent, or Firm* — Schwegman Lundberg & Woessner, P.A.

(57) ABSTRACT

Systems and methods are provided for performing operations including: receiving, via a messaging application, input that selects a collection of augmented reality items; obtaining an identifier of the collection of the augmented reality items; searching, based on the identifier, a plurality of augmented reality items to identify a subset of augmented reality items associated with the identifier; causing the messaging application to present the subset of augmented reality items; and causing the messaging application to modify an image based on a first augmented reality item in the subset.

20 Claims, 11 Drawing Sheets

(51) Int. Cl.
*G06V 20/20* (2022.01)
*G06F 16/583* (2019.01)
*G06F 16/587* (2019.01)
*G06F 3/01* (2006.01)
*G06F 3/04817* (2022.01)
*G06Q 30/06* (2023.01)
*G06Q 30/0601* (2023.01)

(52) U.S. Cl.
CPC .......... *G06F 16/583* (2019.01); *G06F 16/587* (2019.01); *G06Q 30/0643* (2013.01); *G06T 7/74* (2017.01); *G06T 19/006* (2013.01)

(56) References Cited

U.S. PATENT DOCUMENTS

| | | |
|---|---|---|
| 10,114,885 B1 | 10/2018 | Cheng |
| 10,147,129 B1 | 12/2018 | Shang et al. |
| 10,270,983 B1 | 4/2019 | Van Os et al. |
| 10,430,016 B2 | 10/2019 | Monastyrshyn et al. |
| 11,069,094 B1 | 7/2021 | Evangelista et al. |
| 11,335,088 B2 | 5/2022 | Anvaripour et al. |
| 2009/0234716 A1 | 9/2009 | Mallick et al. |
| 2011/0041086 A1* | 2/2011 | Kim ................. G06F 3/0488 715/764 |
| 2011/0134108 A1 | 6/2011 | Hertenstein |
| 2012/0116909 A1 | 5/2012 | Saenz |
| 2014/0085333 A1 | 3/2014 | Pugazhendhi et al. |
| 2015/0055821 A1 | 2/2015 | Fotland |
| 2015/0212664 A1 | 7/2015 | Freer |
| 2016/0054889 A1 | 2/2016 | Hadley et al. |
| 2016/0292926 A1 | 10/2016 | Rosenthal et al. |
| 2017/0052595 A1 | 2/2017 | Poulos et al. |
| 2018/0131878 A1 | 5/2018 | Charlton et al. |
| 2018/0144548 A1 | 5/2018 | Kline et al. |
| 2018/0253901 A1 | 9/2018 | Charlton et al. |
| 2018/0367484 A1 | 12/2018 | Rodriguez et al. |
| 2019/0114836 A1 | 4/2019 | Holzer et al. |
| 2019/0179405 A1 | 6/2019 | Sun et al. |
| 2019/0302979 A1 | 10/2019 | Klein et al. |
| 2019/0371046 A1 | 12/2019 | Trousdale et al. |
| 2020/0020173 A1 | 1/2020 | Sharif |
| 2020/0150832 A1 | 5/2020 | Winn et al. |
| 2021/0303855 A1 | 9/2021 | Anvaripour et al. |
| 2021/0304453 A1 | 9/2021 | Kehrwald et al. |

FOREIGN PATENT DOCUMENTS

| | | |
|---|---|---|
| CN | 115699062 A | 2/2023 |
| KR | 20160131873 A | 11/2016 |
| KR | 20170090057 A | 8/2017 |
| KR | 20180103037 A | 9/2018 |
| WO | WO-2021202191 A1 | 10/2021 |
| WO | WO-2021203119 A1 | 10/2021 |

OTHER PUBLICATIONS

"U.S. Appl. No. 16/834,343, Final Office Action dated Jul. 2, 2021", 18 pgs.
"U.S. Appl. No. 16/834,343, Non Final Office Action dated Mar. 9, 2021", 15 pgs.
"U.S. Appl. No. 16/834,343, Notice of Allowance dated Apr. 8, 2022", 8 pgs.
"U.S. Appl. No. 16/834,343, Notice of Allowance dated Dec. 15, 2021", 8 pgs.
"U.S. Appl. No. 16/834,343, Response filed May 7, 2021 to Non Final Office Action dated Mar. 9, 2021", 9 pgs.
"U.S. Appl. No. 16/834,343, Response filed Aug. 23, 2021 to Final Office Action dated Jul. 2, 2021", 11 pgs.
"U.S. Appl. No. 17/301,087, Non Final Office Action dated Oct. 22, 2021", 31 pgs.
"U.S. Appl. No. 17/301,087, Response filed Feb. 22, 2022 to Non Final Office Action dated Oct. 22, 2021", 11 pgs.
"International Application Serial No. PCT/US2021/023863, International Search Report dated Jul. 15, 2021", 5 pgs.
"International Application Serial No. PCT/US2021/023863, Written Opinion dated Jul. 15, 2021", 6 pgs.
"International Application Serial No. PCT/US2021/070302, International Search Report dated Jul. 14, 2021", 4 pgs.
"International Application Serial No. PCT/US2021/070302, Written Opinion dated Jul. 14, 2021", 4 pgs.
U.S. Appl. No. 17/301,087, filed Mar. 24, 2021, Augmented Reality Experiences for Physical Products in a Messaging System.
U.S. Appl. No. 16/834,343, filed Mar. 30, 2020, Augmented Reality Item Collections.
"U.S. Appl. No. 17/301,087, Final Office Action dated Apr. 22, 2022", 34 pgs.
"U.S. Appl. No. 17/301,087, Response filed Jun. 22, 2022 to Final Office Action dated Apr. 22, 2022", 10 pgs.
"U.S. Appl. No. 17/301,087, Final Office Action dated Feb. 9, 2023", 27 pgs.
"U.S. Appl. No. 17/301,087, Non Final Office Action dated Jun. 9, 2023", 28 pgs.
"U.S. Appl. No. 17/301,087, Non Final Office Action dated Sep. 9, 2022", 21 pgs.
"U.S. Appl. No. 17/301,087, Response filed Jan. 9, 2023 to Non Final Office Action dated Sep. 9, 2022", 14 pgs.
"U.S. Appl. No. 17/301,087, Response filed May 30, 2023 to Final Office Action dated Feb. 9, 2023", 13 pgs.
"International Application Serial No. PCT/US2021/023863, International Preliminary Report on Patentability dated Oct. 13, 2022", 8 pgs.
"International Application Serial No. PCT/US2021/070302, International Preliminary Report on Patentability dated Oct. 13, 2022", 6 pgs.
Grohar, Sanja, "How to do a perfect selfie using YouCam Makeup app", video length 14:46, showing YouCam Makeup app, [Online] Retrieved from the internet: <https://www.youtube.com/watch?v=gR7t53LucuM&t=324s>, (Jul. 22, 2015), 1 pg.
"U.S. Appl. No. 17/301,087, Response filed Sep. 11, 2023 to Non Final Office Action dated Jun. 9, 2023", 15 pgs.

* cited by examiner

AUGMENTED REALITY ITEM COLLECTIONS

CLAIM OF PRIORITY

This application is a continuation of U.S. patent application Ser. No. 16/834,343, filed on Mar. 30, 2020, which is incorporated herein by reference in its entirety.

TECHNICAL FIELD

The present disclosure relates generally to providing graphical elements, such as augmented reality items, using a messaging application.

BACKGROUND

Modern day user devices provide messaging applications that allow users to exchange messages with one another. Such messaging applications have recently started incorporating graphics in such communications. Users can select between various predetermined graphics to incorporate into their communications.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
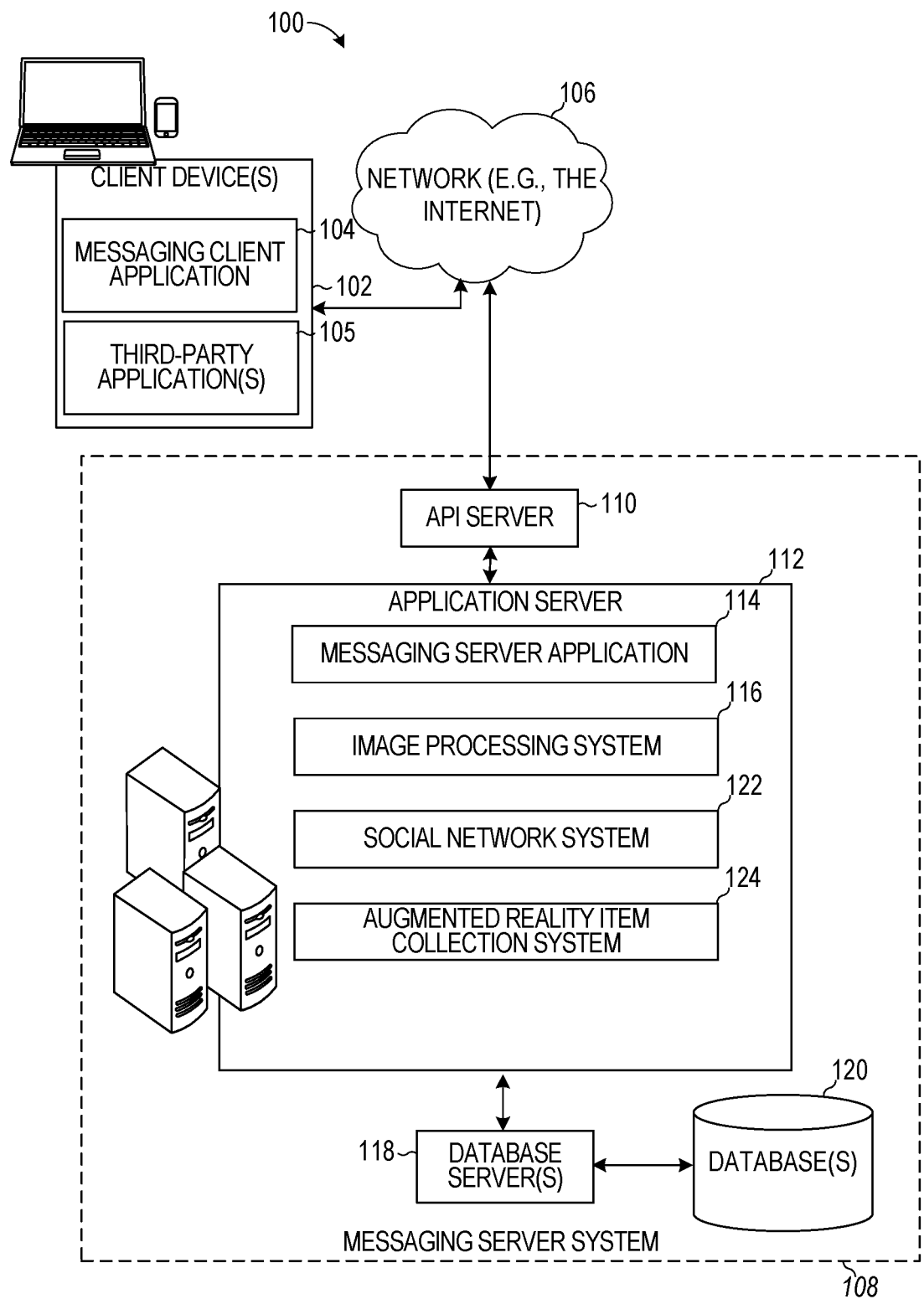
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typically, users exchange messages with each other using messaging applications. Such applications allow users to select from a predefined list of images to send to one another. Users are increasingly communicating with each other using such images to convey their thoughts. However, finding the right images to convey a particular thought can be tedious and time consuming. Specifically, the user has to manually search using keywords for a particular image that conveys a given message. This requires navigating through multiple pages of information until the desired image is found. Given the complexity and amount of time it takes to find the right image, users become discouraged from communicating using the images, which results in a waste of resources or lack of use.

The disclosed embodiments improve the efficiency of using the electronic device by providing a system that provides navigation through augmented reality items using different collections. The user can easily and quickly locate an augmented reality item to use to augment a captured image to be shared with another user in a messaging application or to visualize how a product will look on the user to help in purchasing items. Specifically, according to the disclosed embodiments, a messaging application implemented by one or more processors of a user device, receives input that selects a collection of augmented reality items. The disclosed embodiments obtain an identifier of the collection of the augmented reality items and search, based on the identifier, a plurality of augmented reality items to identify a subset of augmented reality items associated with the identifier. The disclosed embodiments cause the messaging application to present the subset of augmented reality items and to modify an image based on a first augmented reality item in the subset. To assist with navigation through the augmented reality items in the collection, the disclosed embodiments generate a display sequence for selecting or activating different ones of the augmented reality items in the collection. The display sequence can be condition based or time based.

In one example, the augmented reality items can be presented in dependence on a condition being satisfied, such as if a given augmented reality item in the collection was used to enhance an image that is shared with another user or if the user is in a particular location. In another example, the augmented reality items can be presented and progressed through automatically in a particular display sequence that is specified by a third-party provider of the augmented reality items in the collection. In such cases, one augmented reality item of a collection can be automatically presented to augment an image and, after a certain specified threshold period of time, a second augmented reality item in the same collection can be automatically presented to augment an image. This reduces the amount of input a user needs to provide to access and navigate through different augmented reality items. In this way, a user can see how a particular lipstick color looks on their lips in different colors by capturing an image of their face and watching how different colors, corresponding to different augmented reality items in a collection of lipstick colors, are applied to the lips of their face over a given interval. The different lipstick colors are presented and progressed through, each being applied respectively to the lips of the user's face, in a display sequence one after the other, each presented for a threshold period of time.

In this way, the disclosed embodiments improve the efficiency of using the electronic device by reducing the number of screens and interfaces a user has to navigate through to find an augmented reality item to augment an image captured by the user to then share with other users or purchase a product. This reduces the device resources (e.g., processor cycles, memory, and power usage) needed to accomplish a task with the device.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104 and a third-party application 105. Each messaging client application 104 is communicatively coupled to other instances of the messaging client application 104, the third-party application 105, and a messaging server system 108 via a network 106 (e.g., the Internet).

Accordingly, each messaging client application 104 and third-party application 105 is able to communicate and exchange data with another messaging client application 104 and third-party application(s) 105 and with the messaging server system 108 via the network 106. The data exchanged between messaging client applications 104, third-party applications 105, and between a messaging client application 104 and the messaging server system 108 includes functions (e.g., commands to invoke functions) and payload data (e.g., text, audio, video, or other multimedia data). Any disclosed communications between the messaging client application 104 and the third-party application(s) 105 can be transmitted directly from the messaging client application 104 to the third-party application(s) 105 and/or indirectly (e.g., via one or more servers) from the messaging client application 104 to the third-party application(s) 105.

The third-party application(s) 105 and the messaging client application 104 are applications that include a set of functions that allow the client device 102 to access an augmented reality item collection system 124. The third-party application 105 is an application that is separate and distinct from the messaging client application 104. The third-party application(s) 105 are downloaded and installed by the client device 102 separately from the messaging client application 104. In some implementations, the third-party application(s) 105 are downloaded and installed by the client device 102 before or after the messaging client application 104 is downloaded and installed. The third-party application 105 is an application that is provided by an entity or organization that is different from the entity or organization that provides the messaging client application 104. The third-party application 105 is an application that can be accessed by a client device 102 using separate login credentials than the messaging client application 104. Namely, the third-party application 105 can maintain a first user account and the messaging client application 104 can maintain a second user account. In an embodiment, the third-party application 105 can be accessed by the client device 102 to perform various activities and interactions, such as listening to music, videos, track exercises, view graphical elements (e.g., stickers), shop for physical items or goods, communicate with other users, and so forth.

As an example, the third-party application 105 can be a social networking application, a dating application, a ride or car sharing application, a shopping application, a trading application, a gaming application, an imaging application, a music application, a video browsing application, an exercise tracking application, a health monitoring application, a graphical element or sticker browsing application, or any other suitable application.

The messaging client application 104 may present a menu that includes a plurality of augmented reality item collections. The messaging client application 104 may receive a user selection of a first augmented reality collection. In response, the messaging client application 104 retrieves an identifier of the first augmented reality collection and searches for a set of augmented reality items associated with the retrieved identifier. The messaging client application 104 presents icons corresponding to the set of augmented reality items on top of a live or previous captured image or video. A given augmented reality item may be positioned first in the menu and visually distinguished from the remaining augmented reality items to indicate to the user that the given augmented reality item is currently active. The user can browse through the menu to select and activate a different augmented reality item.

Each augmented reality item collection includes a group of categorically or thematically related augmented reality items. As an example, a first augmented reality item collection corresponds to products available for purchase from a first third-party entity. In this case, each augmented reality item in the first augmented reality item collection represents a different product or different features (e.g., colors or styles) of a same product (e.g., lipstick or sunglasses) that can be applied to a live or previously stored image. As another example, a second augmented reality item collection corresponds to characters (real or fictional) that are in a movie, series, video, or comic book created by a second third-party entity. In this case, each augmented reality item in the second augmented reality item collection represents a different character from the movie, series, video, or comic book that can be applied to a live or previously stored image. As another example, a third augmented reality item collection corresponds to popular retro effects or visual effects created by a given third-party entity. In this case, each augmented reality item in the second augmented reality item collection represents a different popular retro effect or visual effect that can be applied to a live or previously stored image. As another example, a fourth augmented reality item collection corresponds to flower crowns. In this case, each augmented reality item in the second augmented reality item collection represents a different flower crown that can be applied to a person's head depicted in a live or previously stored image.

To increase the overall efficiency and reduce bandwidth consumed by a client device 102, the messaging client application 104 may only load the graphical elements for a subset of the augmented reality items that are presented. For example, if a given augmented reality item collection includes 10 different augmented reality items, the messaging client application 104 retrieves from a server the graphical elements, metadata and information for augmenting an image or video using the augmented reality items for the first three of the 10 different augmented reality items. The remaining seven augmented reality items may be represented in the display using respective icons that may be greyed out. When a user input, such as tapping a given one of the seven icons, is received that selects a given augmented reality item for which the graphical elements, metadata and information has not yet been loaded, the messaging client application 104 then communicates with the server to retrieve the graphical elements, metadata and information.

The graphical elements of the active augmented reality item are retrieved and used to augment the image or video presented by the messaging client application 104. For example, the active augmented reality item corresponds to a lipstick color. In such cases, the messaging client application 104 identifies the lips region of a face depicted in the image or video and modifies the color of the lips region based on the color of the graphical elements corresponding to the active augmented reality item.

The menu of augmented reality collections may include identifiers (e.g., thumbnails) that represent each augmented reality item collection. The identifiers may be arranged based on index positions associated with each augmented reality item collection. Augmented reality item collections with low index numbers are presented earlier in the menu than augmented reality item collections with higher index numbers. As one augmented reality item collection is removed from the menu, those augmented reality items that have higher index numbers are advanced in the menu and have their respective index numbers reduced by one. Certain augmented reality item collections are associated with active periods. The active periods may include start and end times or just start times. When the current time is past the start time and, in certain cases when an end time is present, before the end time, the augmented reality item collection enters the active period. During the active period, the augmented reality item collection can be selected by the user to access, view and interact with the augmented reality items associated with the collection. During the active period, the indicator for the active augmented reality item becomes visible in the menu (e.g., not greyed out or added to the menu at a particular position corresponding to the index value of the augmented reality item collection). During an inactive period of an augmented reality item collection, such as when the current time is before the start time or is after the end time of the active period, the indicator for the augmented reality item collection is removed from the menu or is greyed out.

In some cases, the messaging client application 104 may present a menu that includes a plurality of augmented reality items. The messaging client application 104 may receive a user selection of a first augmented reality item. In response, the messaging client application 104 retrieves an identifier of a collection associated with the first augmented reality item and searches for a set of augmented reality items associated with the retrieved identifier of the collection. The messaging client application 104 presents icons corresponding to the set of augmented reality items on top of a live or previous captured image or video. The selected first augmented reality item is visually distinguished from the remaining augmented reality items to indicate to the user that the first augmented reality item is currently active. The user can browse through the menu to select and activate a different augmented reality item of the collection corresponding to the first augmented reality item. The graphical elements of the active augmented reality item are retrieved and used to augment the image or video presented by the messaging client application 104. For example, the first augmented reality item corresponds to a first superhero. In such cases, the messaging client application 104 identifies a collection of superheroes associated with the first superhero and presents icons of all of the superheroes in the collection including the first superhero. The messaging client application 104 modifies a look and feel (body size, style and proportion) of a bode depicted in the image or video based on attributes of the graphical elements corresponding to the first superhero. As a result, the person depicted in the image looks and feels like the first superhero.

The messaging client application 104 may automatically progress through the augmented reality items in the selected collection that are presented according to a particular display or presentation sequence. Each augmented reality item in the collection includes metadata that indicates position information. The messaging client application 104 may use the position information to determine when a given augmented reality item is automatically activated and which augmented reality item to present next in the display sequence. For example, the messaging client application 104 may retrieve the position information of each of the augmented reality items that are in a collection. The messaging client application 104 may form a group that includes some or all of the augmented reality items (e.g., the group may include only 3 augmented reality items of the 15 that are in the collection). The group may include those augmented reality items that have a position number or presentation order that exceeds a threshold. The display sequence of the augmented reality items in the group may be different from the display sequential arrangement of the augmented reality items in the collection of augmented reality items. The messaging client application 104 may arrange the group of augmented reality items in a display sequence based on their position numbers or presentation order. The messaging client application 104 may then automatically start applying each augmented reality item in the display sequence to an image or video displayed by the messaging client application 104.

The messaging client application 104 may present the first augmented reality item to the image or video that is positioned first in the display sequence. After a threshold period of time, such as after 4 seconds, the messaging client application 104 automatically activates and presents a second augmented reality item that is adjacent to the first augmented reality item in the display sequence or presentation order. The graphical elements of the first augmented reality item are removed from presentation and replaced by graphical elements of the second augmented reality item. When the last augmented reality item in the presentation order is presented for the threshold period of time, the messaging client application 104 may return to activating the first augmented reality item. Alternatively, the messaging client application 104 may inform the user that all of the augmented reality items in the group have been presented and request that the user confirm that the user wants to repeat the automatic presentation of the group of augmented reality items.

In one example, the messaging client application 104 presents a first augmented reality item in the collection and obtains metadata associated with the first augmented reality item. The messaging client application 104 determines based on the metadata that a condition needs to be satisfied for presenting a second augmented reality item in the collection. For example, the condition may be event-based, location-based or temporal-based. In particular, the event-based condition may specify that the condition is satisfied when an image augmented with the first augmented reality items is shared with another user. In response to determining that the user augmented an image or video using the first augmented reality item and then sent the augmented image or video to a friend, the condition specified in the metadata for the first augmented reality item is marked as satisfied. In such cases, the second augmented reality items becomes activated and selectable in a menu of the augmented reality items in the collection. The second augmented reality item may include metadata with another condition that needs to be satisfied for presenting and activating a third augmented reality item in the collection. The condition specified in the metadata for the second augmented reality item may be location-based. Such a condition is satisfied when a current location of the client device 102 is within a threshold distance of the location indicated in the condition. In response to determining that the client device 102 is within the threshold distance of the location indicated in the metadata, the condition specified in the metadata for the second augmented reality item is marked as satisfied. In such cases, the third augmented reality items becomes activated and selectable in a menu of the augmented reality items in the collection.

The condition specified in the metadata for the third augmented reality item may be event-based and associated with a different event than the event-based condition for the first augmented reality item. The event-based condition for the third augmented reality item may be satisfied if the client device 102 captures content (e.g., an image or video) that includes a specific object associated with the collection. For example, the third augmented reality item may be a shoe provided by a third-party entity. When the user captures an image of an advertisement for the same shoe provided by the third-party entity, the condition is satisfied and a fourth augmented reality item in the collection may be activated and presented or selectable from the menu.

The fourth augmented reality item may be associated with a time-based condition. The time-based condition may include a start time and an end time for enabling access to the fourth augmented reality item. If the time-based condition is satisfied (e.g., when the current time is between the start time and end time of the fourth augmented reality item), the fourth augmented reality item becomes selectable and activated. If the time-based condition is not satisfied, a message or prompt may be presented to the user informing the user to come back soon at the start time to access the fourth augmented reality item.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, graphical elements, geolocation information, media annotation and overlays, virtual objects, message content persistence conditions, social network information, and live event information, as examples. Data exchanges within the messaging system 100 are invoked and controlled through functions available via user interfaces (UIs) (e.g., graphical user interfaces) of the messaging client application 104.

Turning now specifically to the messaging server system 108, an API server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 and the third-party application 105 in order to invoke functionality of the application server 112. The API server 110 exposes various functions supported by the application server 112, including account registration; login functionality; the sending of messages, via the application server 112, from a particular messaging client application 104 to another messaging client application 104 or third-party application 105; the sending of media files (e.g., graphical elements, images or video) from a messaging client application 104 to a messaging server application 114, and for possible access by another messaging client application 104 or third-party application 105; a graphical element list; the setting of a collection of media data (e.g., story); the retrieval of such collections; the retrieval of a list of friends of a user of a client device 102; maintaining augmented reality items; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the augmented reality item collection system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the augmented reality item collection system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends.

Social network system 122 may access location information associated with each of the user's friends to determine where they live or are currently located geographically. Social network system 122 may maintain a location profile for each of the user's friends indicating the geographical location where the user's friends live.

The augmented reality item collection system 124 manages augmented reality item collections. The augmented reality item collection system 124 enables third-party entities to submit augmented reality items and assign such augmented reality items to one or more augmented reality item collections. The third-party entities can generate an augmented reality item collection if they provide three or more augmented reality items. The augmented reality item collection system 124 publishes the augmented reality item collections and presents the augmented reality item collections to users in a menu. The menu presents indicators (e.g., icons) representing the augmented reality item collections to a user and arranges such icons based on metadata (e.g., index or position information) associated with the augmented reality item collections. The augmented reality item collection system 124 receives input from a user that selects a given augmented reality items collection and searches for augmented reality items associated with a unique or specific identifier of the augmented reality item collection. The augmented reality item collection system 124 presents the identified augmented reality items resulting from the search to the user to enable the user to augmented an image or video using the augmented reality items. In some cases, the augmented reality item collection system 124 automatically progresses through the identified (or subset of the identified) augmented reality items, such that one augmented reality item is presented after another augmented reality item automatically after a threshold period of time (e.g., 4 seconds).

The application server 112 is communicatively coupled to a database server 118, which facilitates access to a database 120, in which is stored data associated with messages processed by the messaging server application 114. Database 120 may be a third-party database. For example, the application server 112 may be associated with a first entity, and the database 120 or a portion of the database 120 may be associated and hosted by a second different entity. In some implementations, database 120 stores user data that the first entity collects about various each of the users of a service provided by the first entity. For example, the user data includes user names, phone numbers, passwords, addresses, friends, activity information, preferences, videos or content consumed by the user, and so forth.

Figure 2:
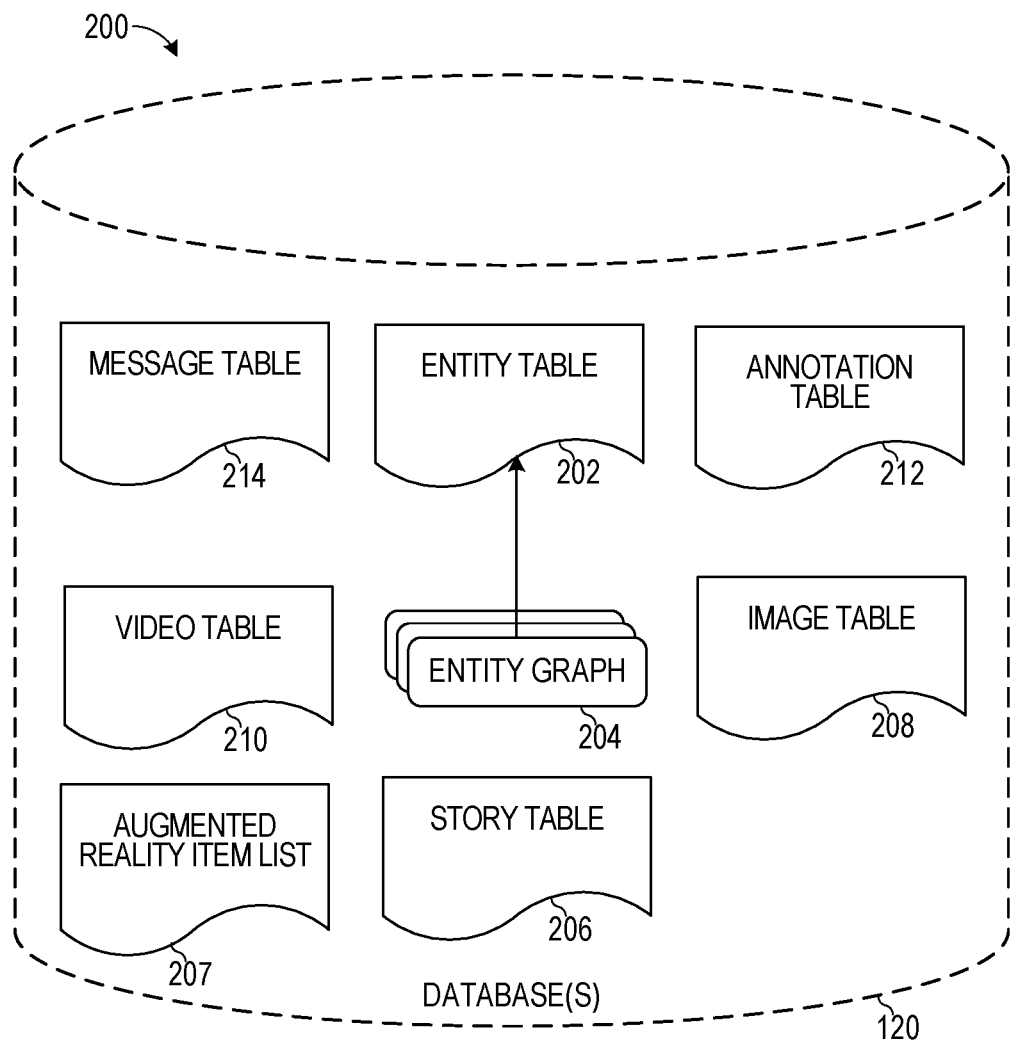
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "LENS" data. A "LENS" may be a real-time special effect and sound that may be added to an image or a video. A LENS is also referred to as an augmented reality item.

As described above, LENSES, overlays, image transformations, AR images and similar terms refer to modifications that may be made to videos or images. This includes real-time modification which modifies an image as it is captured using a device sensor and then displayed on a screen of the device with the modifications. This also includes modifications to stored content, such as video clips in a gallery that may be modified. For example, in a device with access to multiple LENSES, a user can use a single video clip with multiple LENSES to see how the different LENSES will modify the stored clip. For example, multiple LENSES that apply different pseudorandom movement models can be applied to the same content by selecting different LENSES for the content. Similarly, real-time video capture may be used with an illustrated modification to show how video images currently being captured by sensors of a device would modify the captured data. Such data may simply be displayed on the screen and not stored in memory, or the content captured by the device sensors may be recorded and stored in memory with or without the modifications (or both). In some systems, a preview feature can show how different LENSES will look within different windows in a display at the same time. This can, for example, enable multiple windows with different pseudorandom animations to be viewed on a display at the same time.

Data and various systems to use LENSES or other such transform systems to modify content using this data can thus involve detection of objects (e.g. faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a three-dimensional mesh model of the object or objects, and using transformations and animated textures of the model within the video to achieve the transformation. In other embodiments, tracking of points on an object may be used to place an image or texture (which may be two dimensional or three dimensional) at the tracked position. In still further embodiments, neural network analysis of video frames may be used to place images, models, or textures in content (e.g. images or frames of video). LENS data thus refers both to the images, models, and textures used to create transformations in content, as well as to additional modeling and analysis information needed to achieve such transformations with object detection, tracking, and placement.

Real time video processing can be performed with any kind of video data, (e.g. video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some embodiments, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g. using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method a background of the modified object can be changed or distorted as well by tracking and modifying the background.

In one or more embodiments, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve: changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some embodiments of a computer animation model to transform image data using face detection, the face is detected on an image with use of a specific face detection algorithm (e.g. Viola-Jones). Then, an Active Shape Model (ASM) algorithm is applied to the face region of an image to detect facial feature reference points.

In other embodiments, other methods and algorithms suitable for face detection can be used. For example, in some embodiments, features are located using a landmark which represents a distinguishable point present in most of the images under consideration. For facial landmarks, for example, the location of the left eye pupil may be used. In an initial landmark is not identifiable (e.g. if a person has an eyepatch), secondary landmarks may be used. Such landmark identification procedures may be used for any such objects. In some embodiments, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some embodiments, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable and the shape model pools the results of the weak template matchers to form a stronger overall classifier. The entire search is repeated at each level in an image pyramid, from coarse to fine resolution.

Embodiments of a transformation system can capture an image or video stream on a client device and perform complex image manipulations locally on a client device such as client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on a client device.

In some example embodiments, a computer animation model to transform image data can be used by a system where a user may capture an image or video stream of the user (e.g., a selfie) using a client device 102 having a neural network operating as part of a messaging application 104 operating on the client device 102. The transform system operating within the messaging application 104 determines the presence of a face within the image or video stream and provides modification icons associated with a computer animation model to transform image data, or the computer animation model can be present as associated with an interface described herein. The modification icons include changes which may be the basis for modifying the user's face within the image or video stream as part of the modification operation. Once a modification icon is selected, the transform system initiates a process to convert the image of the user to reflect the selected modification icon (e.g., generate a smiling face on the user). In some embodiments, a modified image or video stream may be presented in a graphical user interface displayed on the mobile client device as soon as the image or video stream is captured and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine taught neural networks may be used to enable such modifications.

In some embodiments, the graphical user interface, presenting the modification performed by the transform system, may supply the user with additional interaction options. Such options may be based on the interface used to initiate the content capture and selection of a particular computer animation model (e.g. initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified or such modifications may be individually toggled by tapping or selecting the individual face or a series of individual faces displayed within the graphical user interface.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Augmented reality item list 207 stores augmented reality items available for selection and activation by the messaging client application 104. Each augmented reality item in the augmented reality item list 207 is associated with one or more collections. In an embodiment, the messaging client application 104 searches the collection identifiers stored in the augmented reality item list 207 to identify one or more augmented reality items associated with an augmented reality item collection that is selected. Each augmented reality item stored in the augmented reality item list 207 includes one or more graphical elements or virtual objects which may or may not be animated. Each augmented reality item also includes instructions on where to position the graphical elements or virtual objects relative to other objects depicted in the captured image. Certain augmented reality items are associated with purchasable products. Such augmented reality items include a product catalog identifier and a product identifier. These augmented reality items are dynamically modifiable such that, when the augmented reality items are activated, the product catalog is accessed based on the product catalog identifier. A current price of the product is retrieved from the product catalog using the product identifier as well as updated graphical element information (e.g., position, color, size, style, and so forth). The current price may be presented concurrently with the active augmented reality item and a user can select an option to automatically purchase the product associated with the augmented reality item that is active.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
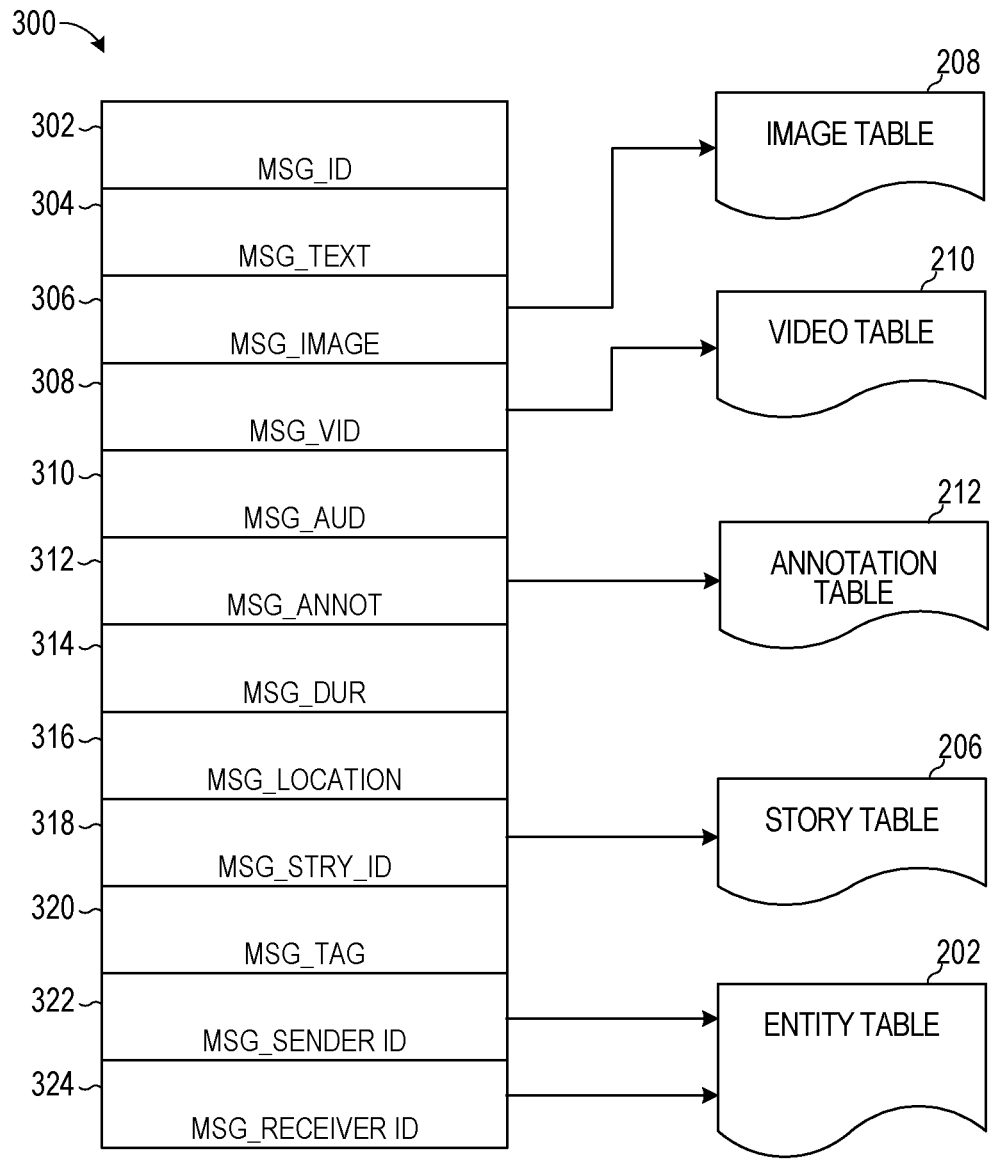
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
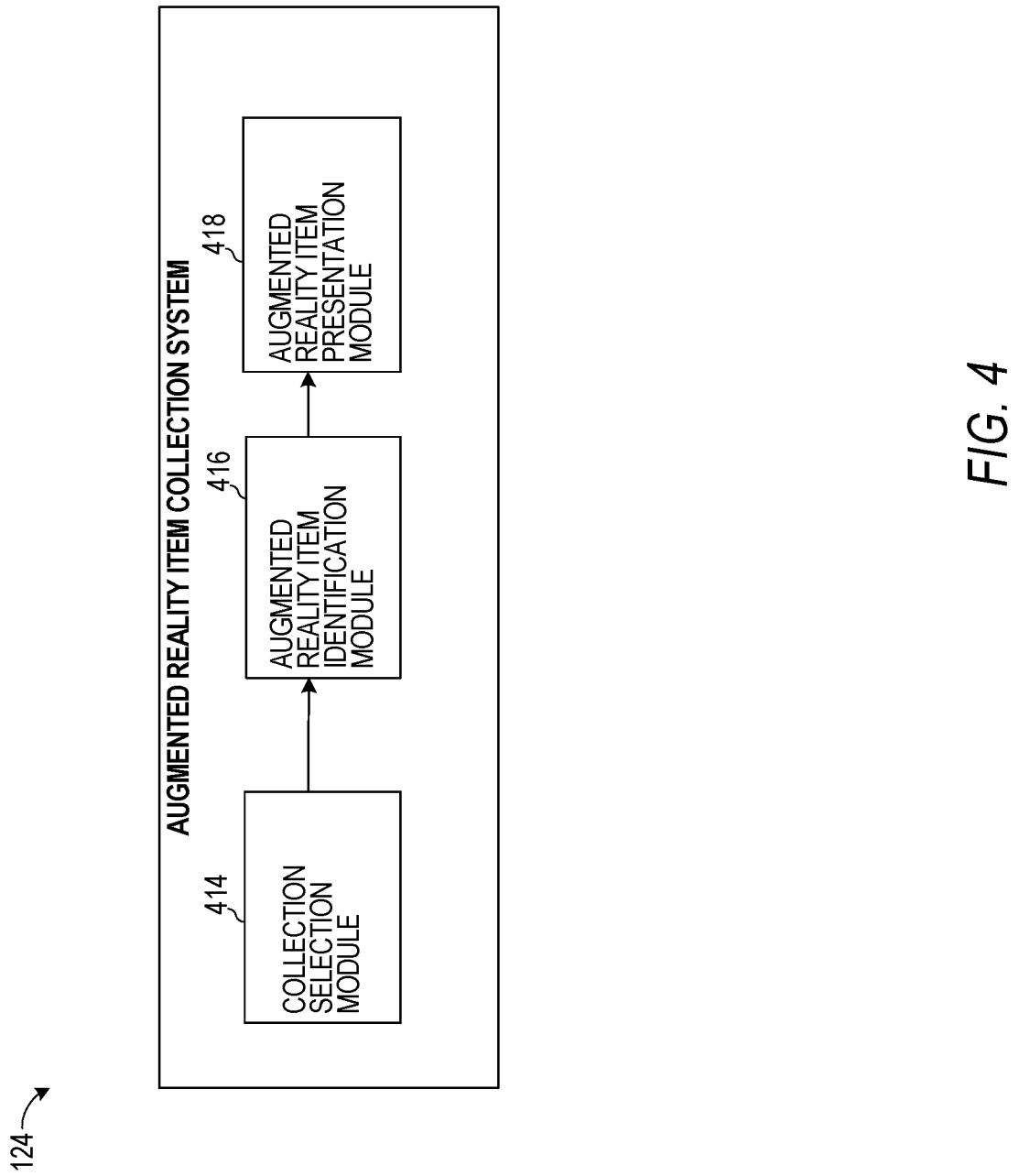
FIG. 4 is a block diagram showing an example augmented reality item collection system, according to example embodiments.

FIG. 4 is a block diagram showing an example augmented reality item collection system 124, according to example embodiments. Augmented reality item collection system 124 includes collection selection module 414, an augmented reality item identification module 416, and an augmented reality item presentation module 418.

The collection selection module 414 receives input from a user that selects a given augmented reality item collection. As an example, the user can navigate through a menu of augmented reality item collections and tap or select a given one of the augmented reality items collections to select the augmented reality item collection. As another example, the user can navigate through a menu of individual augmented reality items. In response to the user tapping or selecting a given augmented reality item from the menu, the augmented reality collection associated with the given augmented reality item is identified and used to retrieve a remaining set of the augmented reality items associated with the same collection. The collection selection module 414 retrieves an augmented reality item collection identifier for the given augmented reality item collection.

The augmented reality item identification module 416 receives the augmented reality item collection identifier from the collection selection module 414. The augmented reality item identification module 416 searches the augmented reality item list 207 to identify one or more augmented reality items that are associated with the collection identifier. For example, the collection identifier may indicate that the selected collection corresponds to a lipstick provided by a third-party entity relative to the provider of the messaging client application 104. In such cases, the augmented reality item identification module 416 identifies a set of augmented reality items that are associated with that lipstick. For example, the set of augmented reality items includes a set of graphical elements that modify lips of a face depicted in an image using different colors to represent different colors of the lipstick. In another example, the collection identifier may indicate that the selected collection corresponds to a collection of superheroes. In such cases, the augmented reality item identification module 416 identifies a set of augmented reality items that are associated with the superheroes. For example, the set of augmented reality items includes a set of graphical elements that modify a person depicted in an image to look like different superheroes corresponding to respective ones of the set of augmented reality items.

The augmented reality item presentation module 418 receives the list of augmented reality items associated with the augmented reality item collection. The augmented reality item presentation module 418 presents a menu on the messaging client application 104 that enables the user to navigate through and active augmented reality items that are part of the augmented reality item collection. The augmented reality item presentation module 418 may selectively load only a first portion of the augmented reality items that are represented in the menu. For example, the augmented reality item presentation module 418 may only load (e.g., retrieve from a server) the graphical elements, metadata and information associated with a first portion of the augmented reality items that are displayed in the menu. When the user selects an augmented reality item for which data has not been loaded, then the augmented reality item presentation module 418 retrieves from the server only the graphical elements, metadata and information for the selected augmented reality item or for the selected augmented reality item and a second portion (e.g., the next three adjacent augmented reality items) in the menu.

The augmented reality item presentation module 418 selectively activates or enables for selection augmented reality items from the menu based on conditions. For example, the augmented reality item presentation module 418 may wait for event-based, location-based or time-based conditions associated with a first augmented reality item or first group of augmented reality items to be satisfied before activating a second augmented reality item or second group of augmented reality items.

Figure 5:
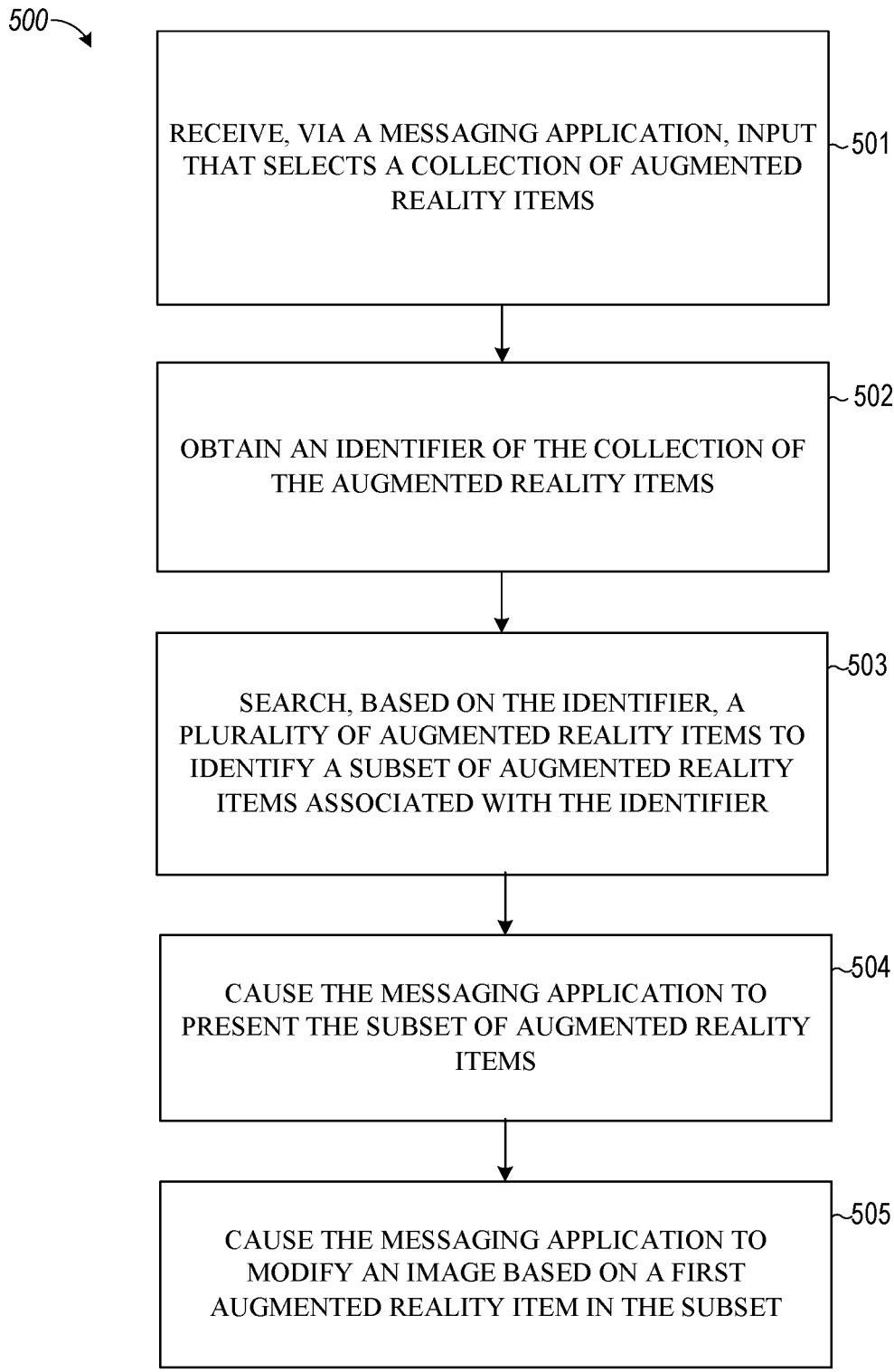
FIG. 5 is a flowchart illustrating example operations of the augmented reality item collection system, according to example embodiments.

FIG. 5 is a flowchart illustrating example operations of the augmented reality item collection system 124 in performing process 500, according to example embodiments. The process 500 may be embodied in computer-readable instructions for execution by one or more processors such that the operations of the process 500 may be performed in part or in whole by the functional components of the messaging server system 108 and/or third-party application 105; accordingly, the process 500 is described below by way of example with reference thereto. However, in other embodiments, at least some of the operations of the process 500 may be deployed on various other hardware configurations. The process 500 is therefore not intended to be limited to the messaging server system 108 and can be implemented in whole, or in part, by any other component. Some or all of the operations of process 500 can be in parallel, out of order, or entirely omitted.

At operation 501, the augmented reality item collection system 124 receives (e.g., via a messaging application installed on a client device 102) input that selects a collection of augmented reality items. As an example, the user can navigate through a menu of augmented reality item collections displayed by the messaging client application 104 and tap or select a given one of the augmented reality items collections to select the augmented reality item collection. As another example, the user can navigate through a menu of individual augmented reality items. In response to the user tapping or selecting a given augmented reality item from the menu, the augmented reality collection associated with the given augmented reality item is identified and used to retrieve a remaining set of the augmented reality items associated with the same collection. The collection selection module 414 retrieves an augmented reality item collection identifier for the given augmented reality item collection.

At operation 502, the augmented reality item collection system 124 obtains an identifier of the collection of the augmented reality items. For example, the augmented reality item collection system 124 accesses metadata for the selected augmented reality item collection stored in augmented reality item list 207 to retrieve a unique identifier (e.g., name or serial number) of the augmented reality item collection.

At operation 503, the augmented reality item collection system 124 searches, based on the identifier, a plurality of augmented reality items to identify a subset of augmented reality items associated with the identifier. For example, the augmented reality item identification module 416 searches the augmented reality item list 207 to identify one or more augmented reality items that are associated with the collection identifier.

At operation 504, the augmented reality item collection system 124 causes the messaging application to present the subset of augmented reality items. For example, the augmented reality item presentation module 418 presents a menu on the messaging client application 104 that enables the user to navigate through and active augmented reality items that are part of the augmented reality item collection.

At operation 505, the augmented reality item collection system 124 causes the messaging application to modify an image based on a first augmented reality item in the subset. For example, the collection identifier may indicate that the selected collection corresponds to a lipstick provided by a third-party entity relative to the provider of the messaging client application 104. In such cases, the augmented reality item identification module 416 identifies a set of augmented reality items that are associated with that lipstick. For example, the set of augmented reality items includes a set of graphical elements that modify lips of a face depicted in an image using different colors to represent different colors of the lipstick.

Figure 6:
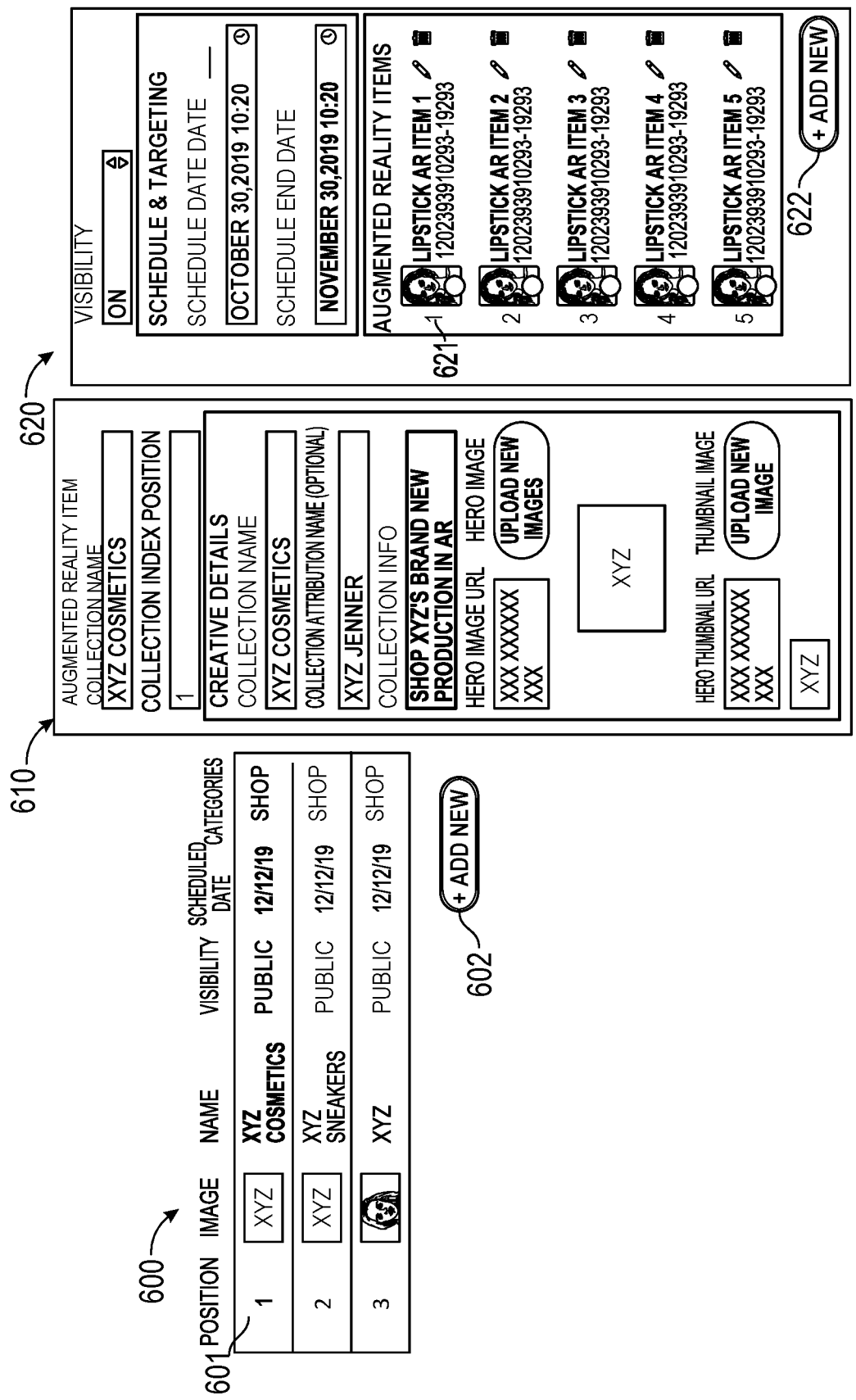
FIGS. 6, 7, 8A, and 8B are illustrative inputs and outputs of the augmented reality item collection system, according to example embodiments.
Figure 7:
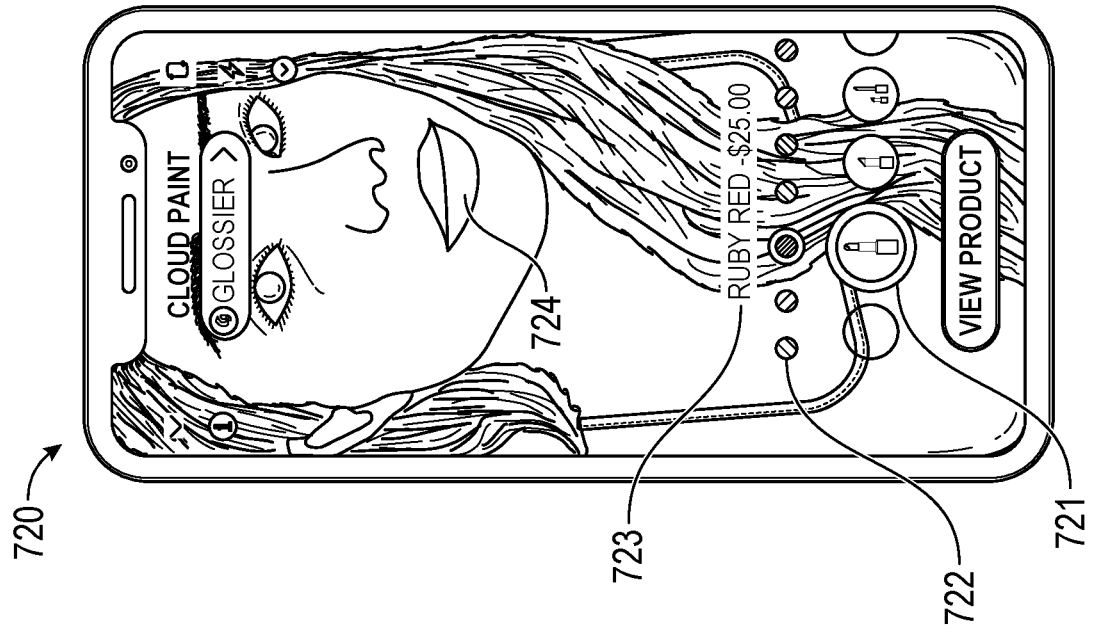
Figure 7:
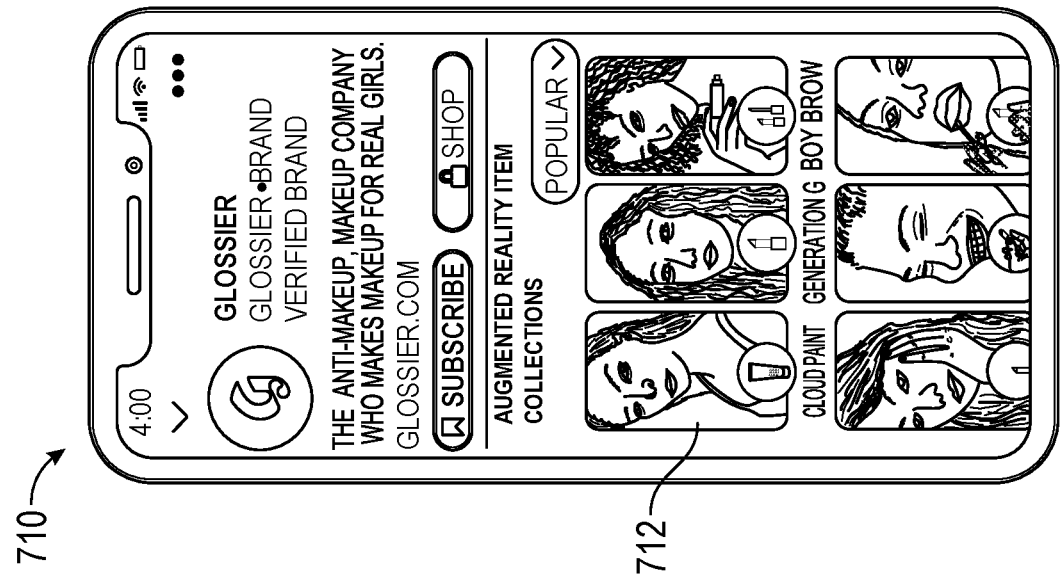

FIGS. 6-8 are illustrative inputs and outputs of the augmented reality item collection system 124, according to example embodiments. The augmented reality item collection system 124 presents a user interface 600 that allows a third-party entity to create, modify, or delete augmented reality items and augmented reality item collections. User interface 600 lists various augmented reality item collections that have been created. An option 602 can be selected to create a new augmented reality item collection. A first augmented reality item collection 601 is positioned first in the list of augmented reality item collections based on an index or position number assigned to the augmented reality item collection 601. In response to receiving a user selection of option 602, user interface 610 is presented to allow a user to add a new augmented reality item collection.

User interface 610 has various input fields for defining parameters of the augmented reality item collection. The input fields include a name field in which a name can be assigned to the augmented reality item collection, a position field which can be used to assign an index or position to the augmented reality item collection, details that identify the third-party entity fields, and a thumbnail field that can be used to supply an image to represent the augmented reality item with an indicator in a menu for selection. User interface 610 may include portions of user interface 620 which include scheduling information fields that enable a user to define an activation period (e.g., starting time and ending time or just a starting time) for the augmented reality item collection. User interface 620 may list augmented reality items 621 associated with the augmented reality item collection. An option 622 is provided that allows the user to add a new augmented reality item to the collection or specify previously created augmented reality item to associated with this augmented reality item collection. The user can adjust the positions of the augmented reality items that are presented to a user in a menu when the user selects the collection by assigning different position or index numbers to the augmented reality items 621 associated with the collection. The user can also drag and drop various ones of the augmented reality items 621 into respective positions to change the display or presentation order of the augmented reality items 621 that are presented to the user.

The user interface 620 may also include a set of condition or parameter fields (not shown). These fields can be used to specify when certain augmented reality items in a given collection are activated and the conditions for activating the augmented reality items (e.g., event-based, location-based, and time-based conditions). Once the user is satisfied with the collections that are defined, the user can save the collections and publish the collections to enables users to select the collections.

As an example, as shown in FIG. 7, a user interface 710 may be presented that lists various augmented reality item collections. A user can select a given augmented reality item collection 712. In response, user interface 720 is presented. User interface 720 includes an image or video of a person's face (this can be a real-time video or live video or a previously captured video or image). The augmented reality items 721 associated with the augmented reality item collection are presented using icons in a menu.

In some implementations, user interface 720 presents a live camera feed from a mobile device or mobile phone together with an application icon for each augmented reality item in the selected augmented reality item collection 712. A selected one of the augmented reality items presented together with the live camera feed is applied dynamically to the camera feed to add one or more graphical elements to one or more objects depicted in the camera feed. In certain embodiments, multiple augmented reality items can be selected to be applied concurrently and in combination such that graphical elements from each of the multiple augmented reality items are retrieved and applied simultaneously to one or more objects depicted in the live camera feed. For example, a lipstick augmented reality item and an eyeliner augmented reality item can both be selected from the augmented reality items 721 that are presented with the live camera feed to modify (apply graphical elements to) the lips and the eyes of a face depicted in the camera feed.

A first augmented reality item can be selected and attributes 722 are presented for adjusting properties of the first augmented reality item that is selected. As an example, the first augmented reality item is a lipstick style and the properties that can be adjusted are the colors of the lipstick style. As the user changes the color of the lipstick by selecting the attributes 722, the lips portion 724 of the face int eh image or video is changed to have the style, properties or color of the selected lipstick style and color. In some cases, each attribute 722 (e.g., color) is automatically presented for a threshold period of time (e.g., 4 seconds) after which a subsequent attribute 722 (e.g., color) is presented. After all of the attributes are automatically progressed through and presented, a second lipstick or makeup style 721 is automatically selected and presented on the face depicted in the image. Attributes associated with the second lipstick or makeup style 721 are again automatically progressed one at a time and activated and presented for the threshold period of time.

Figure 8A:
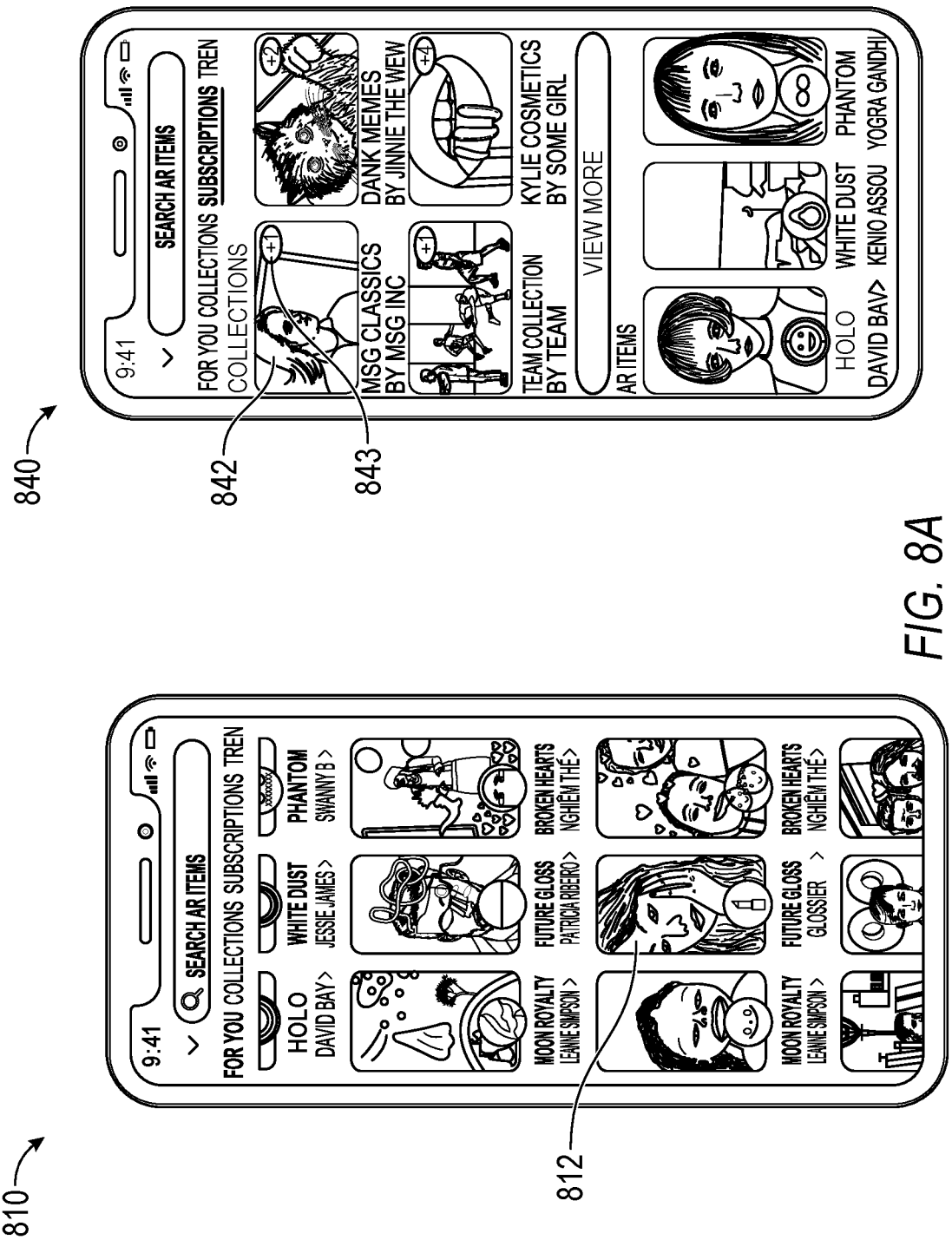

As another example, the user interface 720 is presented when a user selects an individual augmented reality item from a list of augmented reality items shown in user interface 810 (FIG. 8A). In response to receiving a user selection of the first augmented reality item 812 from the list shown in user interface 810, the other augmented reality items that are in the same collection as the first augmented reality item 812 are retrieved. The user interface 720 is then presented in which the selected first augmented reality item 812 is activated and the remaining augmented reality items are displayed.

In some implementations, a user can subscribe to one or more augmented reality item collections, such as by tapping on a subscribe icon associated with a given augmented reality item collection. By subscribing to a given augmented reality item collection, the user can remain informed with any changes (e.g., additions or removals) of augmented reality items in the given augmented reality item collection. Whenever a change is detected, such as an augmented reality item being added to the augmented reality item collection, a notification, such as a push notification, is sent to the client device 102 which is subscribed to the collection. The push notification may include an option to access or view the collection with the added augmented reality item or view just the newly added augmented reality item. For example, the user can swipe on the notification to automatically launch a camera feed, such as a live camera feed, and to automatically activate the newly added augmented reality item identified by the notification.

As shown in FIG. 8A, a user interface 840 is presented for presenting a list of subscriptions the user has created to various augmented reality item collections 842. To reach user interface 840, a user swipes right or left from the user interface 810 one or more times. Each augmented reality item collection 842 to which the user subscribes is represented by an icon or thumbnail that includes a badge or indicator 843. The indicator 843 indicates the number of new augmented reality items that have been added to the augmented reality item collection 842 since the user last accessed the augmented reality item collection 842. In some cases, a given augmented reality item collection to which the user subscribes expires or is made unavailable after a given interval or end time. At that time, the icon or thumbnail corresponding to the expired collection is removed from user interface 840. If the user selects an unsubscribe option associated with a given collection, the icon or thumbnail corresponding to the unsubscribed collection is removed from user interface 840 and the user will no longer receive notifications identifying changes to the collection.

In response to receiving a user selection of the icon or thumbnail corresponding to augmented reality item collection 842, a live camera feed is presented to the user and the newest augmented reality item in the collection is automatically presented and activated. When the user returns to view the list of augmented reality item collections to which the user subscribes in user interface 840, the previously presented badge or indicator 843 is removed as the user has already viewed or accessed the new augmented reality items represented by the indicator 843.

Figure 8B:
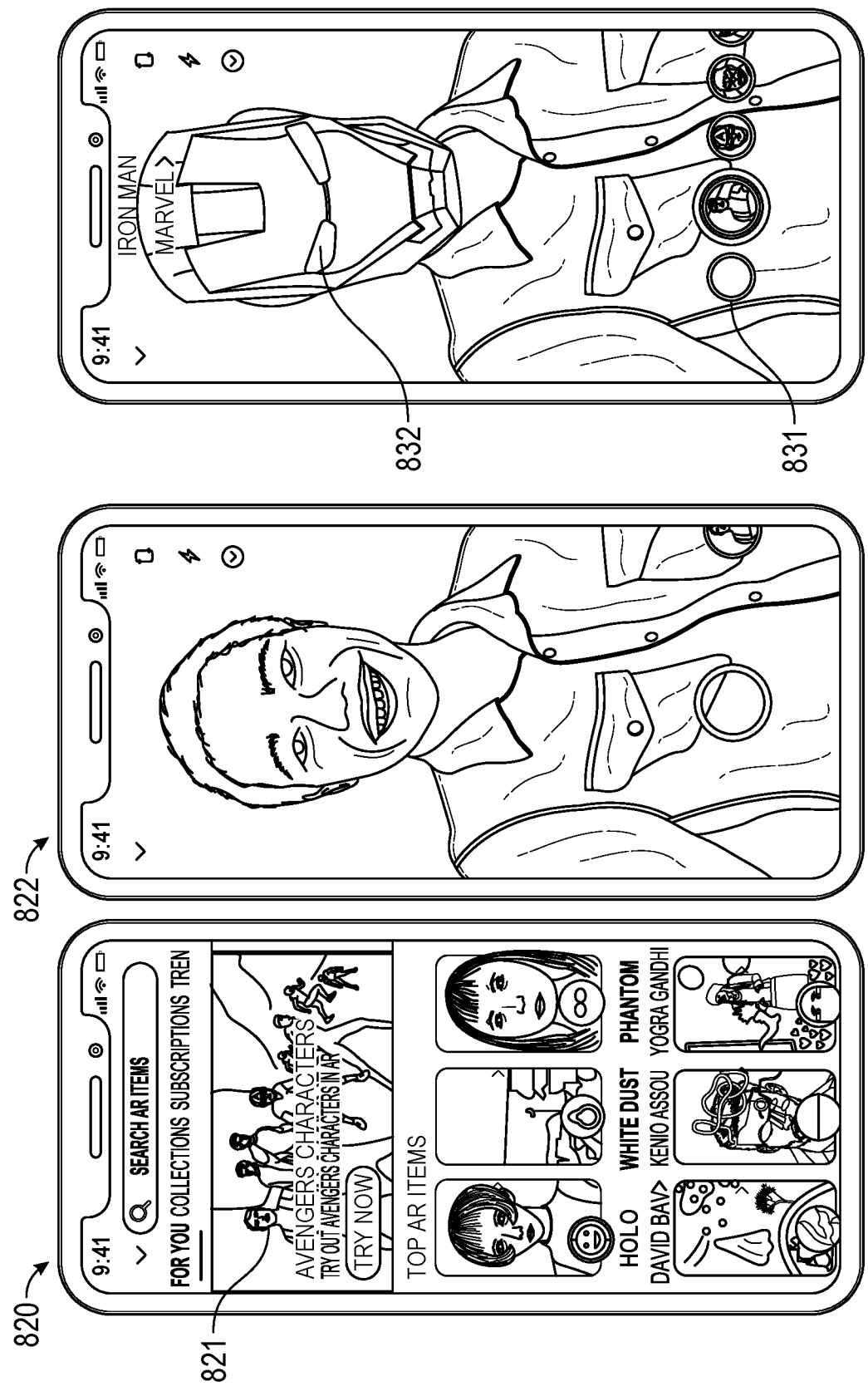

FIG. 8B shows a user interface for accessing augmented reality items and augmented reality item collections. Specifically, user interface 820 is presented in which an augmented reality item collection 821 is shown at the top of the screen using an icon or thumbnail. The icon or thumbnail may include an animation corresponding to the augmented reality item collection 821. For example, the augmented reality item collection 821 corresponds to superheroes or characters in a movie, comic book, video, or story. In this case, the icon or thumbnail may include a short 5 second clip of the movie or video in which the characters or superheroes of the augmented reality item collection 821 appear. The user can select an option to access the augmented reality items of the augmented reality item collection 821, such as by tapping on the icon or thumbnail representing the collection. In response, a camera feed 822 is presented together with the list of augmented reality items available for selection from the collection 821. In some cases, the messaging client application 104 processes a profile of the user to determine and identify a favorite superhero of the user from the movie, comic book, video, or story. If a favorite superhero is found, the messaging client application 104 automatically navigates to and activates the augmented reality item corresponding to the favorite superhero in a camera feed in response to receiving the user selection of the icon or thumbnail for the collection 821. To do so, the messaging client application 104 retrieves an identifier (e.g., a superhero name) from the user's profile and searches metadata of the augmented reality items in the selected collection to identify an augmented reality item associated with the retrieved identifier. If one is found, the augmented reality item is automatically activated when the camera feed is presented or is moved to the top of the list of augmented reality items in the collection that are presented to the user.

Camera feed 822 depicts a face of the user and when a user selects a given augmented reality item from the list of augmented reality items 831, visual properties, such as graphical elements associated with the selected augmented reality item are retrieved and used to modify the face depicted in the camera feed 822. For example, a helmet or face 832 corresponding to the superhero represented by the selected augmented reality item overlays or replaces the face depicted in the camera feed.

Figure 9:
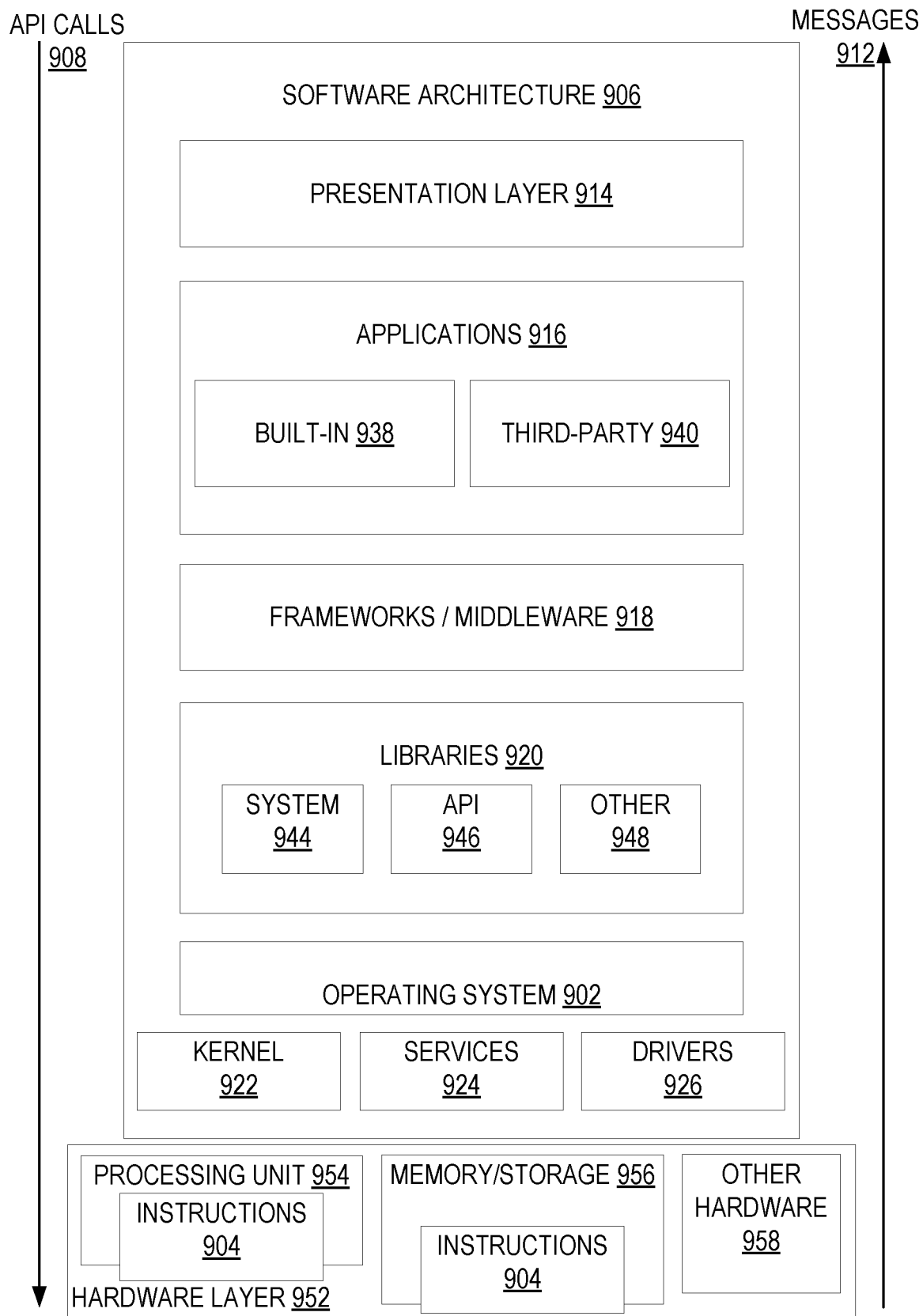
FIG. 9 is a block diagram illustrating a representative software architecture, which may be used in conjunction with various hardware architectures herein described, according to example embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and input/output (I/O) components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic user interface functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
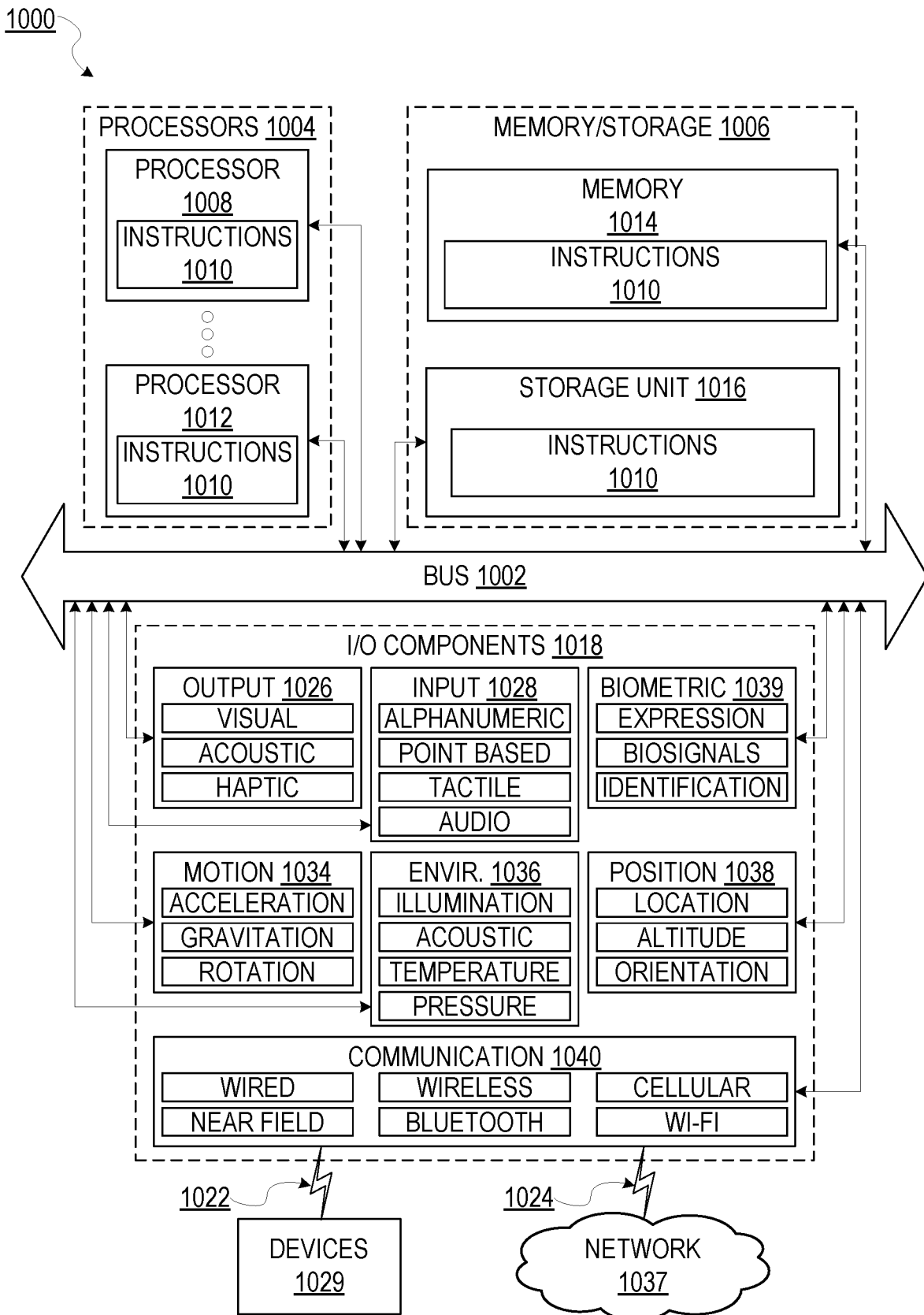
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors (sometimes referred to as "cores") that may execute instructions contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1039, motion components 1034, environmental components 1036, or position components 1038 among a wide array of other components. For example, the biometric components 1039 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1037 or devices 1029 via coupling 1024 and coupling 1022, respectively. For example, the communication components 1040 may include a network interface component or other suitable device to interface with the network 1037. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1029 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra book, netbook, laptop, multi-processor system, microprocessor-based or programmable consumer electronics, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
    causing an application to present a subset of augmented reality items associated with a collection of augmented reality items;
    receiving a request to subscribe to the collection of augmented reality items;
    in response to receiving the request to subscribe to the collection of augmented reality items, displaying a notification to a user indicating changes to augmented reality items in the collection of augmented reality items, the changes comprising addition of augmented reality items to the subset of augmented reality items and removal of augmented reality items from the subset of augmented reality items;
causing the application to modify an image based on a first augmented reality item in the subset;
determining that the image has been modified by the first augmented reality item for a threshold period of time; and
in response to determining that the image has been modified by the first augmented reality item for the threshold period of time, automatically replacing the first augmented reality item with a second augmented reality item in the subset to modify the image based on the second augmented reality item, wherein additional augmented reality items in the subset are automatically applied to modify the image upon of each subsequent passage of the threshold period of time.

2. The method of claim 1, further comprising:
receiving input that selects the collection of augmented reality items;
obtaining an identifier of the collection of augmented reality items;
searching, based on the identifier, a plurality of augmented reality items to identify the subset of augmented reality items associated with the identifier.

3. The method of claim 1, further comprising:
after automatically modifying the image based on the second augmented reality item, determining that the second augmented reality item is a last augmented reality item in the subset; and
in response to determining that the image has been modified by the second augmented reality item for the threshold period of time and that the second augmented reality item is the last augmented reality item in the subset, automatically replacing the second augmented reality item with a third augmented reality item in the subset that precedes the first augmented reality item.

4. The method of claim 1, further comprising:
after automatically modifying the image based on the second augmented reality item, determining that the second augmented reality item is a last augmented reality item in the subset; and
in response to determining that the image has been modified by the second augmented reality item for the threshold period of time and that the second augmented reality item is the last augmented reality item in the subset, automatically presenting a message indicating that all augmented reality items in the subset have been presented, the message comprising an option to repeat automatic presentation of the subset of augmented reality items.

5. The method of claim 1, further comprising:
obtaining metadata associated with each of the augmented reality items in the subset;
retrieving a presentation order from the metadata; and
automatically applying the subset of augmented reality items based on the presentation order.

6. The method of claim 1, further comprising:
obtaining metadata associated with each of the augmented reality items in the subset;
determining, based on the metadata, a condition for applying the second of the augmented reality items after the first augmented reality item; and
applying the second augmented reality item in response to determining that the condition has been satisfied.

7. The method of claim 1, further comprising providing an option to unsubscribe from the collection of augmented reality items to prevent future notifications from being provided.

8. The method of claim 1, the notification comprising an option to access or view the changes to the collection of augmented reality items.

9. The method of claim 1, further comprising:
displaying an indicator associated with an identifier of the collection of augmented reality items, the indicator comprising a value representing a quantity of new augmented reality items that have been added to the collection of augmented reality items since the collection of augmented reality items was last accessed by the application to present the subset of augmented reality items.

10. The method of claim 1, the notification comprising an option to view just newly added augmented reality items in the collection of augmented reality items.

11. The method of claim 1, further comprising:
determining that a current time is within an active period of the subset; and
in response to determining that the current time is within the active period of the subset, presenting an indicator of the subset in a display of the messaging application.

12. The method of claim 1, further comprising:
detecting a gesture that swipes on the notification;
in response to detecting the gesture, automatically launching a camera feed and automatically activating a newly added augmented reality item identified in the notification.

13. The method of claim 1, further comprising:
prior to presenting the subset of augmented reality items, receiving input that selects the first augmented reality item associated with the subset; and
in response to receiving the input that selects the first augmented reality item, obtaining an identifier of the subset of augmented reality items.

14. The method of claim 1, wherein the subset comprises a makeup collection associated with a third-party relative to a provider of the application, wherein the subset of augmented reality items comprises a plurality of lipstick colors, further comprising:
detecting a face in the image;
identifying a lips region in the face; and
applying a color associated with a first of the plurality of lipstick colors to the lips region of the face.

15. The method of claim 14, further comprising:
retrieving a catalog identifier and a product identifier of the first lipstick color;
retrieving, from a computing device of a third party, color information and price information using the catalog identifier and product identifier; and
presenting the price information on the image while applying the color based on the retrieved color information.

16. The method of claim 1, wherein the subset comprises a superheroes collection associated with a third-party relative to a provider of the application, wherein the subset of augmented reality items comprises a plurality of superheroes, further comprising:
detecting a person in the image; and
modifying the person based on attributes of a first superhero of the plurality of superheroes.

17. The method of claim 1, further comprising:
causing the application to present icons of each of the subset of augmented reality items;

loading information associated with generating a display of a portion of the subset of the augmented reality items;

detecting input that navigates to select an icon of the icons associated with a second augmented reality item for which information has not yet been loaded; and loading the information for the second augmented reality item in response to detecting input that navigates to select the icon associated with the second augmented reality item.

18. The method of claim 1, wherein the subset is a first collection, further comprising:

causing the application to present a first set of icons representing a plurality of different collections of augmented reality items, the plurality of different collections comprising the first collection;

receiving input that selects a first icon in the first set of icons associated with the first collection of augmented reality items; and causing the application to present a second set of icons together with the first set of icons, the second set of icons representing the subset of augmented reality items of the first collection.

19. A system comprising:

at least one processor of a computing device configured to perform operations comprising:

causing an application to present a subset of augmented reality items associated with a collection of augmented reality items;

receiving a request to subscribe to the collection of augmented reality items;

in response to receiving the request to subscribe to the collection of augmented reality items, displaying a notification to a user indicating changes to augmented reality items in the collection of augmented reality items, the changes comprising addition of augmented reality items to the subset of augmented reality items and removal of augmented reality items from the subset of augmented reality items;

causing the application to modify an image based on a first augmented reality item in the subset;

determining that the image has been modified by the first augmented reality item for a threshold period of time; and in response to determining that the image has been modified by the first augmented reality item for the threshold period of time, automatically replacing the first augmented reality item with a second augmented reality item in the subset to modify the image based on the second augmented reality item, wherein additional augmented reality items in the subset are automatically applied to modify the image upon of each subsequent passage of the threshold period of time.

20. A non-transitory machine-readable storage medium that includes instructions that, when executed by one or more processors of a machine, cause the machine to perform operations comprising:

causing an application to present a subset of augmented reality items associated with a collection of augmented reality items;

receiving a request to subscribe to the collection of augmented reality items;

in response to receiving the request to subscribe to the collection of augmented reality items, displaying a notification to a user indicating changes to augmented reality items in the collection of augmented reality items, the changes comprising addition of augmented reality items to the subset of augmented reality items and removal of augmented reality items from the subset of augmented reality items;

causing the application to modify an image based on a first augmented reality item in the subset;

determining that the image has been modified by the first augmented reality item for a threshold period of time; and in response to determining that the image has been modified by the first augmented reality item for the threshold period of time, automatically replacing the first augmented reality item with a second augmented reality item in the subset to modify the image based on the second augmented reality item, wherein additional augmented reality items in the subset are automatically applied to modify the image upon of each subsequent passage of the threshold period of time.

\* \* \* \* \*